US007157108B2

(12) United States Patent
Bhaskar et al.

(10) Patent No.: US 7,157,108 B2
(45) Date of Patent: Jan. 2, 2007

(54) MILK PROTEIN PRODUCTS AND PROCESSES

(75) Inventors: Ganugapati Vijaya Bhaskar, Palmerston North (NZ); Harjinder Singh, Palmerston North (NZ); Neil D. Blazey, Santa Rosa, CA (US)

(73) Assignee: New Zealand Dairy Board, Wellington (NZ)

( * ) Notice: Subject to any disclaimer, the term of this patent is extended or adjusted under 35 U.S.C. 154(b) by 257 days.

(21) Appl. No.: 10/148,976

(22) PCT Filed: Dec. 11, 2000

(86) PCT No.: PCT/US00/33521

§ 371 (c)(1),
(2), (4) Date: Sep. 4, 2002

(87) PCT Pub. No.: WO01/41578

PCT Pub. Date: Jun. 14, 2001

(65) Prior Publication Data

US 2003/0096036 A1    May 22, 2003

(30) Foreign Application Priority Data

Dec. 9, 1999    (NZ) .................................. 501676

(51) Int. Cl.
*A23C 9/12* (2006.01)
(52) U.S. Cl. ............................ 426/40; 426/36; 426/38; 426/582; 426/657
(58) Field of Classification Search .................. 426/34, 426/36, 38, 40, 42, 580, 582, 656, 657
See application file for complete search history.

(56) References Cited

U.S. PATENT DOCUMENTS

| 2,346,844 | A | 4/1944 | Hull |
| 2,503,866 | A | 4/1950 | Chrysler et al. |
| 4,018,752 | A | 4/1977 | Buhler et al. |
| 4,450,182 | A | 5/1984 | Stahl et al. |
| 4,676,988 | A | 6/1987 | Efstathiou et al. |
| 5,334,398 | A | 8/1994 | Sueyasu et al. |
| 5,576,040 | A | 11/1996 | Moller et al. |
| 6,139,901 | A | 10/2000 | Blazey et al. |

FOREIGN PATENT DOCUMENTS

| EP | 016 292 A1 | 9/1979 |
| EP | 16292 | 10/1980 |
| EP | 016292 | 10/1980 |
| EP | 0 226 035 | 11/1986 |
| FR | 2450064 | 9/1980 |
| FR | 2452879 | 10/1980 |
| FR | 2470546 | 6/1981 |
| JP | 4179440 | 7/1990 |

OTHER PUBLICATIONS

Korolczuk J, New Zealand Journal of Dairy Science and Technology, 17, 135-140 (1982).
Puri et al., Indian Journal of Dairy Science, 22, 155-161 (1969).
Puri et al., Indian Journal of Dairy Science, 30, 27-29 (1977).
Ranjith et al., Journal of Dairy Research, 66, 139-144 (1999).
Starbuck, Kidney International, 2, 175-177, (1972).
A. Caron et al. "Coagulation of Milk Enriched with Ultrafiltered or Diafiltered Microfiltered Milk Retentate Powders", Int. Dairy Journal 7 (1997) pp. 445-451.
St. Gelais et al. "Coagulation of Milk Enriched with Low Mineral Retentate Powders", Milchwissenschaft 48 (1993) pp. 603-606.
Tejipari Kezikonyv (Dr. Balatoni M. and Dr. Ketting F.) Mezogazdasagi Kiado; Budapest, 1981; p. 432, 433 and 435 (Hungarian) with English translation of relevant sections.
St. Gelais et al. "Growth and Activities of Lactococcus lactis in Milk Enriched with Low Mineral Retentate Powders", J Dairy Sci 75:2344-2352 (1992).
St. Gelais et al. "Coagulation of milk enriched with low mineral retentate powders", Milchwissenschaft 48 (11) p. 603-606 (1993).
St. Gelais et al. "Whey synersis of milk enriched with different retentate powders", Milchwissenschaft 50 (2) p. 71-75 (1995).
Mistry et al., "Use of High Milk Protein Poder in the Manufacture of Gouda Cheese," Int. Dairy Journal 6 p. 205-216 (1996).

*Primary Examiner*—Leslie Wong
(74) *Attorney, Agent, or Firm*—Knobbe Martens Olson & Bear LLP (57) ABSTRACT

The invention relates to dried milk protein concentrates and their use. In particular the invention relates to such dried concentrates which have been calcium-depleted to an extent which allows improvements in the use of dried milk protein concentrates in cheese manufacture. The invention includes a method of cheese manufacture comprising: (a) dispersing in milk a dried MPC or MPI having at least 70% dry matter as milk protein; (b) treating the resulting mixture with one or more coagulating enzymes to produce a curd; and (c) processing the curd to make cheese; wherein the dried MPC or MPI is a calcium-depleted MPCF or MPI and the extend of calcium depletion is sufficient to allow manufacture of substantially nugget-free cheese.

31 Claims, 4 Drawing Sheets

Preparation of Calcium Depleted MPCs

MILK PROTEIN PRODUCTS AND PROCESSES

This application is a 371 of PCT/US00/33521, filed Dec. 11, 2000.

1. Technical Field

This invention relates to milk products, processes for their preparation and use, particularly in cheese manufacture.

2. Background Art

A "milk protein concentrate" (MPC) is a milk protein product in which greater than 55%, preferably greater than 75% of the dry matter is milk protein and the ratio of casein to whey proteins is approximately that of milk. Such concentrates are known in the art.

The term "milk protein isolate" (MPI) refers to a milk protein composition comprising a substantially unaltered proportion of casein to whey proteins wherein the dry matter consists of greater than 85% milk protein. Such isolates are known in the art.

These products differ from milk concentrates in that they are high in protein and low in fat and lactose. They differ from skim milk concentrates in that they are high in protein and low in lactose.

One use for MPC and MPI is in cheese manufacture. By addition of these to increase the protein concentration of milk used in the manufacture of cheese, cheese making can be made more consistent and more efficient.

Using evaporation and drying, it is possible to obtain dried MPC and MPI. However these dried products suffer from the disadvantage that they are associated with the formation of "nuggets" in the cheese. Nuggets are thin protein gels of a different colour in the cheese. Nugget formation is consistently a problem when dried MPI with 85% dry matter as milk protein is used. Nugget formation occurs on some but not all occasions when a dried MPC with 70% dry matter as milk protein is used. These problems can be overcome by use of elevated temperatures after mixing the dried MPC or MPI with the milk. However, this adds an extra step to the cheese manufacturing process.

An object of the present invention is to prepare a dried milk protein product with a reduced tendency to cause nugget formation in cheesemaking relative to corresponding dried milk protein products of the prior art or at least to provide the public with a useful choice.

DISCLOSURE OF THE INVENTION

In one aspect, the invention provides a method of cheese manufacture comprising:
 (a) dispersing in milk a dried MPC or MPI having at least 70% dry matter as milk protein;
 (b) treating the resulting mixture with one or more coagulating enzymes to produce a curd, and
 (c) processing the curd to make cheese;

wherein the dried MPC or MPI is a calcium-depleted MPC or MPI and the extent of calcium depletion is sufficient to allow manufacture of substantially nugget-free cheese.

The extent of calcium-depletion required varies according to the protein content of the MPI or MPC. The higher the degree of calcium depletion required. For MPI having 85% dry matter as milk protein calcium depletion of 30–100% is required. Where the calcium depletion is only 25%, problems with nugget formation are present. By contrast if the protein content is 70%–80% of dry matter, a lower extent of calcium depletion is sufficient, for example 20% depletion.

In another aspect, the invention provides a method of cheese manufacture which includes the step of adding a 30–100%, preferably 40–100% more preferably 50–100% calcium depleted MPC or MPI powder to the milk used as the starting material. In particular the invention provides a method of cheese manufacture comprising:
 (a) dispersing in milk a dried MPC or MPI having at least 70% dry matter as milk protein;
 (b) treating the resulting mixture with one or more coagulating enzymes to produce a curd, and
 (c) processing the curd to make cheese;

wherein the dried MPC or MPI has calcium depletion of 30–100%.

In a further aspect the invention provides a method for preparing a dried MPC or MPI, product comprising:
 (a) providing an MPI or MPC having at least 70% dry matter as milk protein in aqueous solution/suspension;
 (b) removing a 30–100% of calcium ions therein by a method chosen from at least one of (1) cation exchange on an ion exchanger in the sodium and/or potassium form (2) acidification to pH 4.6–6 with subsequent dialysis and/or ultrafiltration and/or diafiltration or (3) by addition of a chelating agent; and/or binding a proportion of calcium ions with a chelating agent;
 (c) optionally mixing the product from step (b) with another milk solution while maintaining at least 30% calcium depletion; and
 (d) drying to prepare a dried product.

The term "cold solubility" or "cold soluble" refers to the property a product which on reconstitution into a 5% w/v solution at 20° C. provides less than 5% sediment on centrifugation for 10 minutes at 700 g.

The term calcium ions is used broadly and includes ionic calcium and colloidal calcium unless the context requires otherwise.

In another aspect the invention provides a method for preparing a dried MPC or MPI, product comprising:
 (a) providing an MPC or MPI, having at least 70% dry matter as milk protein in aqueous solution/suspension;
 (b) removing 40–100% of calcium ions therein by a method chosen from at least one of (1) cation exchange on an ion exchanger in the sodium and/or potassium form, (2) acidification to pH 4.6–6 with subsequent dialysis and/or ultrafiltration and/or diafiltration or (3) by addition of a chelating agent; and/or binding a proportion of calcium ions with a chelating agent;
 (c) optionally mixing the product from step (b) with another milk solution while maintaining the percentage calcium depletion in the range 40–100%; and
 (d) drying to prepare a dried product.

In another aspect processes analogous to those of the first two aspects are used but the starting material is a milk-derived solution containing casein and whey proteins in which whey proteins comprise 5–60% of the protein.

In those embodiments in which calcium removal is by acidification and subsequent dialysis and/or ultrafiltration and/or diafiltration, the pH is adjusted to be in the range 4.6–6, preferably 4.8–5.5. The membrane chosen generally has a nominal molecular weight cut off of 10,000 Daltons or less. A preferred ultrafiltration membrane is a Koch S4 HFK 131 type membrane with a nominal molecular weight cut off at 10,000 Daltons. The adjustment of the pH may be made with any acid suitable for adjusting the pH of a food or drink eg, dilute HCl, dilute $H_2SO_4$, dilute acetic acid, dilute citric acid, preferably dilute citric acid.

When the calcium removal is by way of addition of a chelating agent, preferred chelating agents for use include citric acid, EDTA, food phosphates/polyphosphates, food acidulants, tartaric acid, citrates and tartrates. The preferred chelating agents are food acidulating agents. Preferably the chelating agents are used in conjunction with dialysis and/or ultrafiltration and diafiltration.

The preferred cation exchangers are based on resins bearing strongly acidic groups, preferably sulphonate groups.

A preferred strong acid cation exchange resin for use in this and other embodiments of the invention is IMAC HP 111 E manufactured by Rohm & Haas. This resin has a styrene divinylbenzene copolymer matrix. The functional groups are sulphonic acid groups that can be obtained in the $Na^+$ form or alternatively converted to the $K^+$ form. The use of the $Na^+$ or $K^+$ form is preferred.

By manipulating the pH and the choice of sodium or potassium or a mixture of both, it is possible to vary the flavour of the product. For some circumstances it will be useful also to provide micronutrient cations in addition to sodium or potassium.

One cation preferred for the use with sodium and/or potassium is magnesium.

The liquid product obtained at the end of step (d) or (c) may be dried by standard techniques including thermal falling film evaporation and spray drying. Drying may be preceded by dewatering.

The use of strong acid cation exchangers is preferred because with weakly acidic cation exchangers, phosphate is also removed which lowers the nutritional value of the product. The product has particular advantages at high percentage protein (eg 85%) in its relatively high solubility in cold water, milk and other aqueous solutions. This enables it to be stored in the dry form and then be reconstituted by addition of water then required for use in the liquid state. The reconstituted material does not sediment out in the same manner as occurs with dried MPC and MPI without calcium depletion at higher percentage protein after storage. This provides advantages not only in cheese manufacture but also in other applications.

In another aspect the invention provides a method for the manufacture of cheese using calcium-depleted MPC or MPI prepared by the method of these aspects of the invention. The advantages of higher protein concentration in cheese manufacture are obtained but the problem of formation of "nuggets" is avoided.

The MPC or MPI applied to the cation exchanger preferably has the a pH in the range 5.6–7.0, more preferably 5.6–6.2. Once the MPC or MPI has passed through the column, its pH increases. If it increases above 7.0, it will generally be adjusted to about 6.5–7.0 to make it more palatable.

Cation exchange is the preferred method for removing calcium.

In another embodiment the invention provides a 30–100% calcium depleted MPI or MPC powder having at least 70% by weight of protein. Throughout the range of calcium depletion the powders are useful for preparing nutritional drinks and have the advantage of superior solubility after storage relative to MPC or MPI powders which have no such calcium depletion particularly after storage.

In a preferred form of this embodiment of the invention, the MPC or MPI powder has 40–100%, preferably 50–100% calcium depletion wherein the calcium is substituted by sodium and/or potassium. These MPCs and MPIs have advantages in avoidance of "nugget" formation when added to milk to be used to prepare the cheese in contrast to the nugget formation observed with prior art MPCs and MPIs are used. A blend of dried MPC or MPI with 30–100% calcium depletion and whole milk powder may usefully be used for cheese making.

In a further preferred embodiment the invention provides a method of preparing a dried MPC or MPI comprising:
  (a) providing a low fat milk solution, for example skim milk, in liquid form;
  (b) removing 30–100% of calcium ions therein by a method chosen from at least of (1) cation exchange on an ion exchanger in the sodium and/or potassium form, or (2) acidification to pH 4.6–6 optionally with subsequent dialysis;
  (c) optionally mixing the calcium-depleted milk with another milk solution while retaining the percentage calcium depletion in the range 30–100%;
  (d) concentrating the solution obtained by ultrafiltration, optionally with diafiltration, to form an MPI or MPC having at least 70% dry weight as protein; and
  (e) drying to prepare a dried product.

In one variation the MPC or MPI formed at step (d) is mixed with an MPC or MPI of different percentage calcium depletion while retaining percentage calcium depletion in the range 30–100% before drying.

This method differs from the previously described method in that the material undergoing cation exchange is not an MPC or MPI, but is subsequently converted to be one in a step following the ion exchange.

The use of the cation exchange method is preferred.

Again the use of strong acid cation exchangers in preferred. The product is useful in the same applications as described above, including provision of a nutritious drink and use in addition to milk prior to cheese manufacture.

Likewise variations such as the preferred substitution of calcium by sodium or potassium or a mixture thereof are equally applicable in this aspect.

The ion exchange steps are preferably carried out at 4–12° C., but may be carried out at temperatures as high as 50° C.

The MPC and MPI products have the property of good stability on storage. This can be demonstrated by observation of the retention of good cold solubility on storage.

BRIEF DESCRIPTION OF DRAWINGS

FIG. 2 shows the percentage solubility at 20° C. and 5% (w/v) in water of four dried MPI samples stored at (A) 20° C. and (B) 40° C.

EXAMPLES

The following Examples further illustrate practice of the invention.

Example 1

Preparation of Dried Calcium Depleted MPCs by Ion-Exchange

Figure 1:
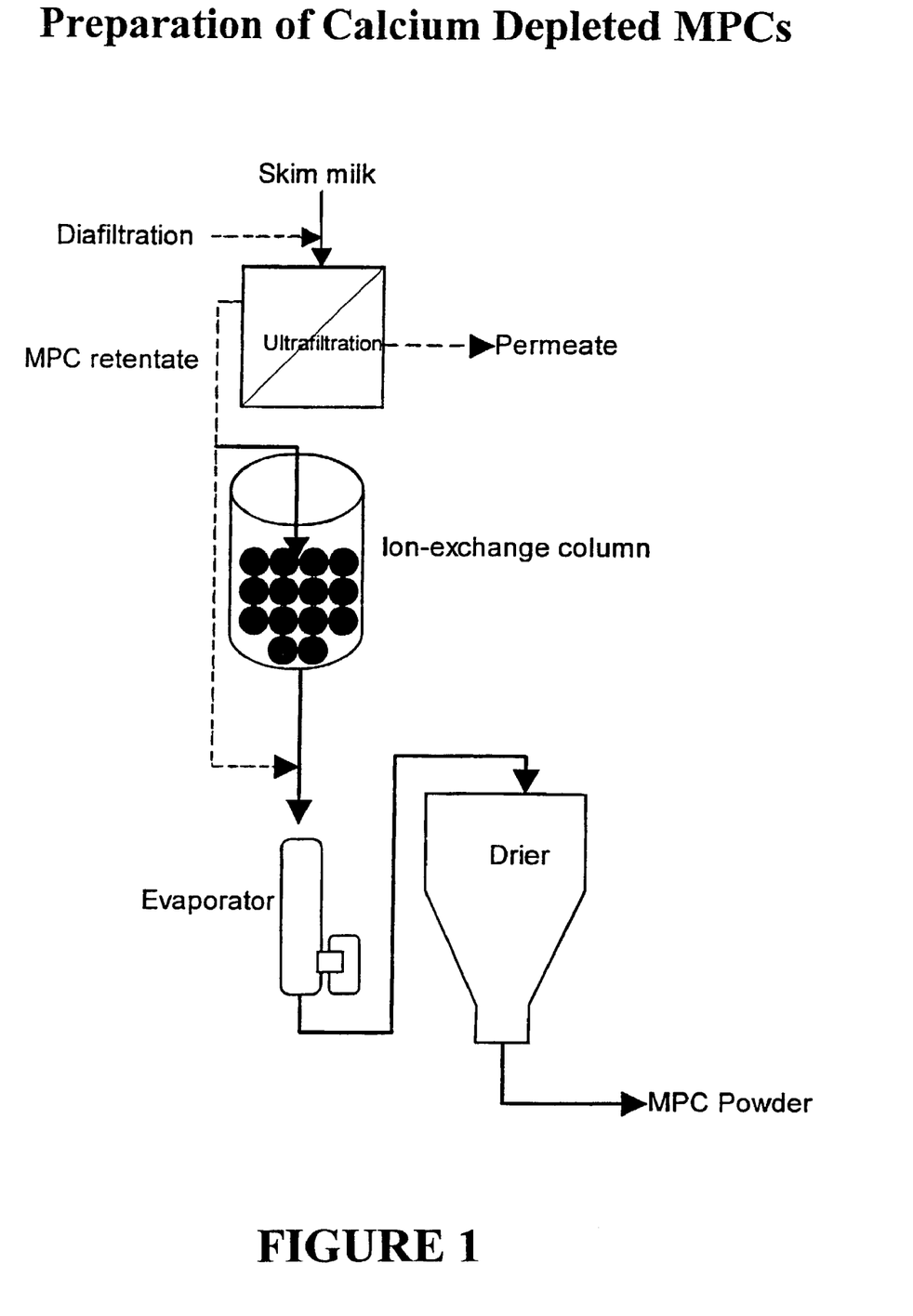
FIG. 1 is a schematic drawing of a process for preparing dried calcium depleted MPI.

As illustrated in FIG. 1, skim milk is subjected to concentration on an ultrafiltration (or a microfiltration) membrane (Koch S4 HFK 131 type membranes having a nominal molecular weight cut-off of 10,000 daltons) to produce an MPC retentate. Depending on the concentration factor used, the MPC retentate will have a protein content in the range of 42–85% of the dry matter is milk protein.

For example when a skim milk of 1000 kg of concentration given in Table 1, is concentrated by 2.5 times, 400 kgs of MPC56 retentate and 600 kgs of permeate will be obtained.

A part of the 400 kg MPC56 retentate, which had a pH of 6.8 was reduced to 5.9, using 3.3% citric acid. The acid was added to the retentate at 10° C., while continuously agitating the retentate. For example, to produce 50% Ca-depleted MPC56, 200 Kg of the retentate was pH-adjusted to 5.9. After fifteen minutes, the pH of the retentate was measured again. Depending on the buffering capacity of the retentate, the pH of pH-adjusted retentate increases by 0.1 to 0.15 units. The pH was adjusted again to 5.9 with some more 3.3% citric acid.

The 200 kg of MPC56 retentate contains 0.26% of calcium or a total calcium content of 530 g of calcium. To remove all this calcium approximately 70 L of strong cation-exchange resin in the sodium form was used. The resin was an IMAC HP 111 E, a strong acid cation exchange resin with a total exchange capacity of 2 eq/L of sodium. The resin is manufactured by Rohm & Haas and has sulphonic acid functional groups.

The resin was loaded into a stainless steel vessel of about 40 cm in diameter and a height of 110 cm or a total volume of 140 L. Seventy litres of the resin bed had a height of 55 cm. The 200 kg of the retentate was then passed through the resin at 2 bed volume an hour or 140 L/h. To process 200 kg of the retentate takes about one-and-a-half hours. The resulting retentate had about 0.005% of calcium and a pH of about 7.1. The calcium-depleted MPC56 was mixed with untreated MPC56 in equal proportions to produce a retentate containing 0.13% calcium. This retentate was then evaporated and dried to produce an MPC56 powder containing 0.8% calcium. The composition of the powder is shown in column A of Table 2. Evaporation is preferably carried out at pH 6.4.

If an MPC70 or an MPC85 retentate is used as a feed stream instead of MPC56 retentate, then Ca-depleted MPC70 and MPC85 of the compositions given in columns B and C respectively Table 2 below can be produced. MPC 70 and MPC 85 retentates are diluted prior to passage through the ion-exchange column:

TABLE 1

Milk Composition

| Component | Skim Milk (%) |
| --- | --- |
| Ash | 0.76 |
| Lactose | 5.17 |
| Fat | 0.06 |
| Casein Protein | 2.88 |
| Whey Protein | 0.58 |
| Total Protein | 3.67 |

TABLE 2

Compositions of Milk Protein Concentrates

| MPC | A | B | C |
| --- | --- | --- | --- |
| Total protein | 56 | 70 | 85 |
| Ash | 7–9 | 7–9 | 6–8 |
| Lactose | 28–30 | 14–16 | <5 |
| Fat | 0.9–1.1 | 1.5–1.6 | >1.7 |
| Calcium | 0.8 | 0.9 | 1.1 |
| Sodium (%) | 2.0 | 2.1 | 2.4 |

All these MPCs are shown to have high cold solubility at the start as well as after storage. In contrast, the MPC made without ion-exchange process had a low cold water solubility which reduced to below 50% on storage.

The ion exchange resin when exhausted can be regenerated by passing 2–3 bed volumes of 2 molar NaCl solution. The eluate contains a high level of soluble calcium derived from exchange from the retentate.

Example 2

Solubility

Figure 2A:
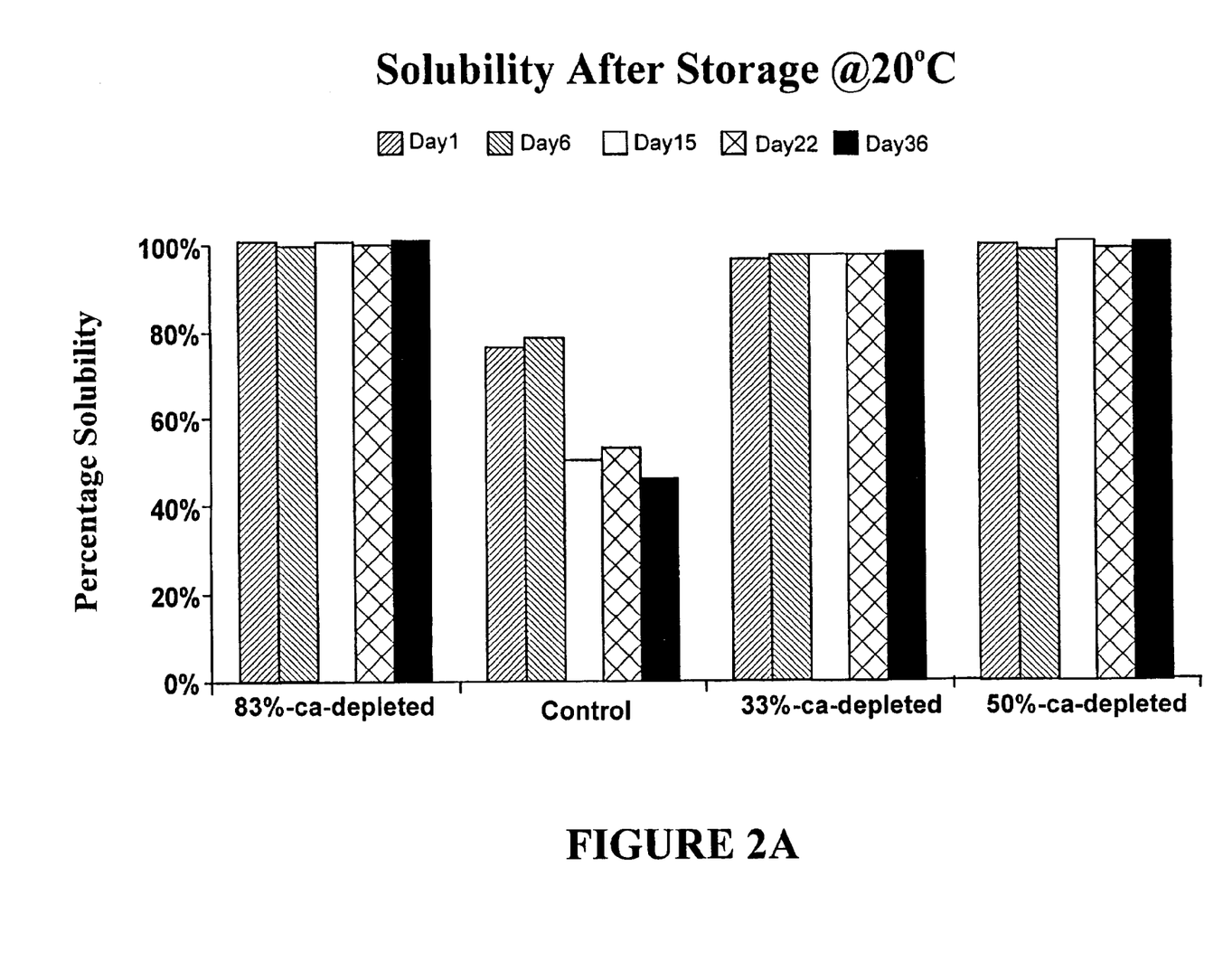
Figure 2B:
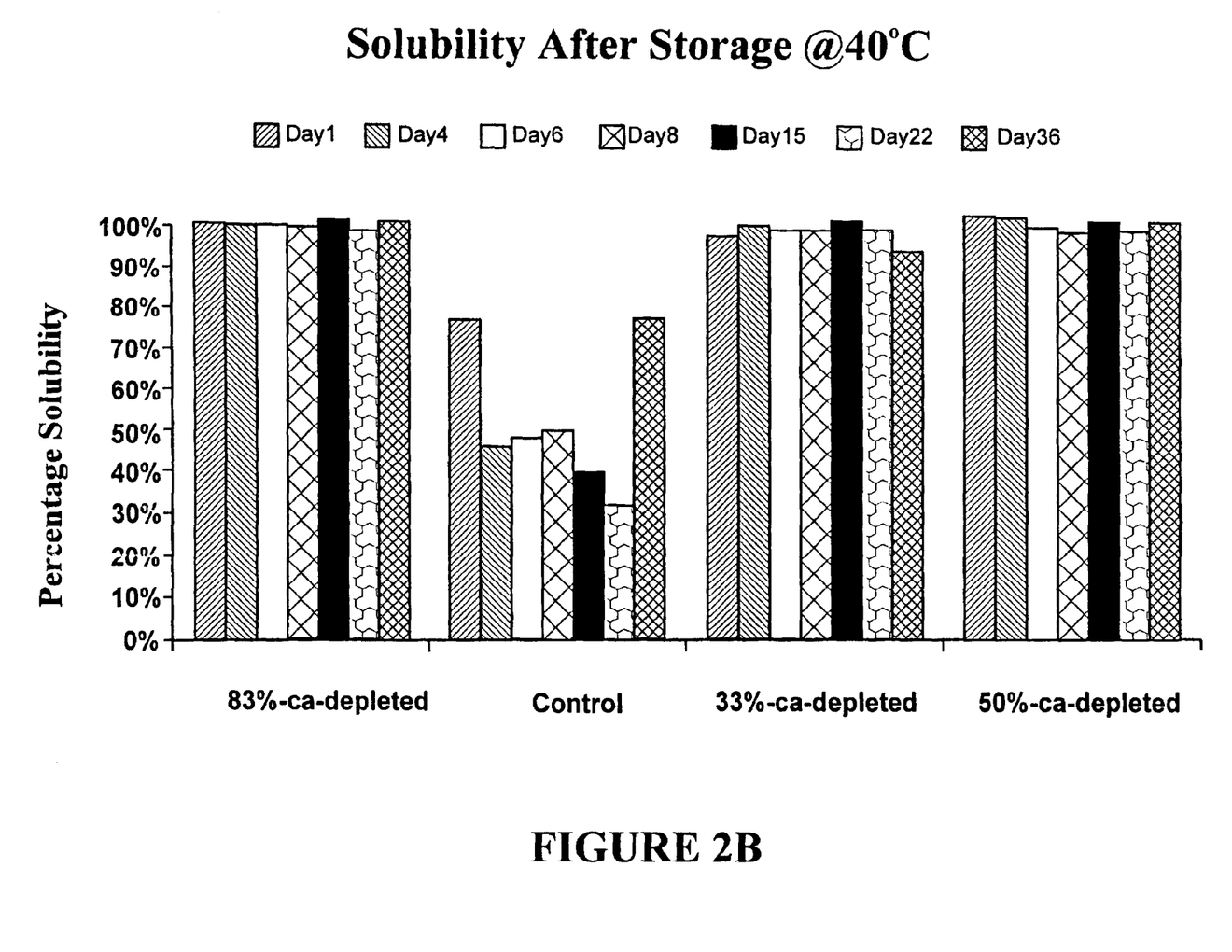

Four dried MPI samples with 85% milk protein were tested for solubility after storage over a period of time. For each a 5% w/v solution was prepared in water after 1, 6, 15, 22 and 36 days. After reconstituting into a 5% w/v solution at 20° C., the solutions were centrifuged for 10 minutes at 700 g. The results are shown in FIGS. 2A and 2B. The three calcium depleted samples (33%, 50% and 83% depletion) stored at 20° C. all showed approximately 100% solubility on each occasion. The control dried MPI samples showed about 70–80% solubility on days 1–6 and this declined to about 50% by days 15 to 36. Similar results were obtained with storage at 40° C.

Example 3

Cheese Preparation

Four MPC samples with 85% milk protein were tested in cheese making. 3.6 kg of fresh skim milk containing 3.55% protein and 0.05% fat was the starting material. Fresh cream (400 grams) was added under medium shear to the fresh skim milk previously brought to 32.5° C. The resulting milk solution contained 3.42% protein and 4.36 fat as determined by Milkoscan Analyses.

The milk solution was divided into four batches. To each batch a different MPC containing 85% protein was added. One batch received control MPC with no calcium depletion. The reconstitution temperature was 6.5–8.5° C. The other three batches received calcium depleted MPCs each with 85% protein. The calcium depletion was 25%, 50% and 98%. The reconstitution was carried out at a temperature of 6.5–8.5° C. for the 33% calcium depleted MPC. For the 50% and 98% calcium depleted MPCs a temperature of 4.5–6.0° C. was used.

All powders dispersed into the milk well. No problems were noticed with powders lumping, not wetting or floating on top of the milk. The pH of all the reconstituted milks were similar pH between 6.5 and 6.7 when measured at 32.5° C.

Cheese manufacture was by a standard cheddar process. The rennet used was Australian DS.

After two days the cheese preparations were examined. In the four cheese preparations to which control MPC and 25% calcium depleted MPC had been added, many large grey translucent nuggets were obvious. No nuggets were observed for those preparations to which 50% calcium depleted MPC or 98% calcium depleted MPC had been added.

Observations made during the cheese making steps showed that the starters performed excellently in all the re-constituted milks and that the pH changed from 6.66 to pH 6.54 over the 15 minute incubation.

Except for the preparation to which 98% calcium depleted MPC had been added all preparations developed a coagulum at 40 minutes after rennet was added. No coagulum was formed with the 98% calcium depleted MPC sample until calcium (0.05%) was added. The coagulum with 50% calcium depleted MPC was fragile however the fragile curd firmed up well as cooking began. It was observed that the curd in the vat with 98% calcium depleted MPC cooked much faster than the rest. For all four samples the cooked curd character was excellent.

Whey casein, protein, fat, TS, a-lac, b-lg, BSA and Gmp were measured for each sample. No differences were identified between the wheys and at separation all the whey samples looked similarly turbid.

None of the curds presented any problems during the salting and pressing steps. The calcium depleted MPC powders support formation of nugget free cheddar cheese in the laboratory with powders having more than 25% calcium depletion being required.

Example 4

Preparation of Cold Soluble MPC by low pH Diafiltration

Skim milk is subjected to concentration on an ultrafiltration membrane (Koch S4 HFK 131 type membranes having a nominal molecular weight cut-off of 100,000 daltons) in the following way.

About 150 liters of skim milk is concentrated until the total solids in the retentate is about 15% to give about 50 L of retentate and 100 L of permeate. The protein in the retentate is further concentrated using continuous diafiltration, until the permeate solids were about 1.5%. The retentate was then pH-adjusted using 55 sulfuric acid to a pH below 5.8. The pH below 5.8. The pH-adjusted retentate is again continuously diafiltered with water (preferably demineralised) until the permeate solids concentration reaches below 0.1%. The final retentate is then neutralized using 5% NaOH solution to a pH of 6.7 and then it was dried to produce MPC powder of the composition given in Table 3. Depending on the pH of the acidification, the calcium in the final product can be reduced by 30% at pH=5.8 and about by 45% at pH=5.4.

TABLE 3

Composition of Milk Protein Concentrate of Example 4

| Fat % w/w | Moisture % w/w | Protein % w/w | Lactose % w/w | Calcium % | pH of acidification |
|---|---|---|---|---|---|
| 2.97 | 4.59 | 86.13 | 0.26 | 1.3 | 5.8 |
| 2.09 | 3.98 | 88.682 | 0.13 | 1.9 | control |
| 2.16 | 3.66 | 88.682 | 0.27 | 1.0 | 5.6 |

Figure 3:
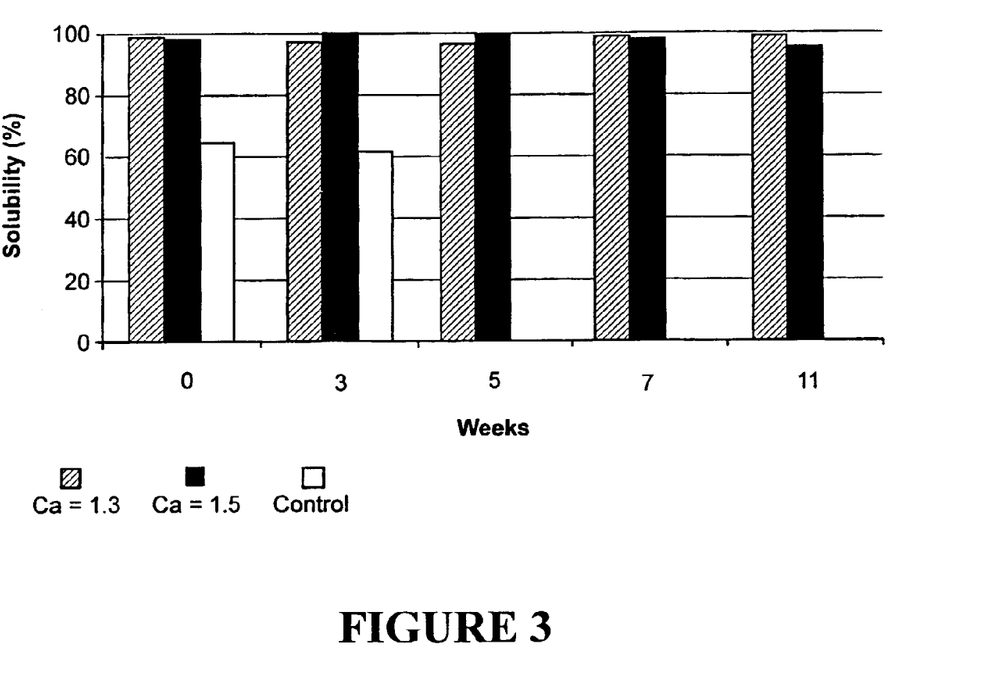
FIG. 3 shows the percentage solubility at 20° C. and 5% (w/v) in water of two calcium-depleted MPC samples and control where calcium depletion was by low pH diafiltration.

The MPC powders were stored at 40° C. for many weeks and their solubilities are monitored. FIG. 3 clearly shows that the solubility of MPCs, which had undergone acid diafiltration, maintained their initial solubility, whereas the control, made without the acid diafiltration, had a continuously reducing solubility.

Example 5

Cheese Preparation using MPC70

Four MPC samples with 70% milk protein were tested in cheese making. Cheese milk with a fat to protein of 1.2 was prepared by standardising fresh, fortified skim milk with fresh cream. Normally, 1 part cream was added to 7 parts milk. The cream (at 30° C.) was added to the milk (also at 30° C.) under medium shear.

The standardised milk was divided into four batches. A different MPC containing 70% protein was added to each batch. Three batches received commercial MPCs with no calcium depletion. One batch MPC with 70% protein and 20% calcium depletion (by cation exchange). The reconstitution was carried out at a temperature of 1 8° C.

All powders dispersed into the milk well. No problems were noticed with powders lumping, not wetting or floating on top of the milk. The pH of all the reconstituted milks were similar and between 6.4 and 6.5 when measured at 32.5° C.

Cheese manufacture was by a standard cheddar process. Calcium chloride was added to all batches at a rate of 0.2 g/L of milk. The rennet used was Australian DS.

The cheese preparations were examined after being pressed overnight at 5° C. In the three cheese preparations to which commercial MPCs containing 70% protein had been added small, grey translucent nuggets were obvious. No nuggets were observed in the cheese preparation to which 20% calcium depleted MPC had been added.

Example 6

Cheese Preparation using Low pH UF MPC 85

Three MPC samples with 85% milk protein were tested in cheese making.

Cheese milk with a fat to protein ratio of 1.2 was prepared by standardising fresh, fortified skim milk with fresh cream. Normally, 1 part cream was added to 7 parts milk. The cream (at 30° C.) was added to the milk (at 30° C.) under medium shear.

The standardised milk was divided into three batches. A different MPC containing 85% protein was added to each batch. One batch received a control MPC with no calcium depletion. The other two batches received calcium depleted MPCs with 85% protein prepared as described in Example 4. Calcium depletion was effected by ultrafiltration at low pH. The levels of calcium depletion were 33% and 46%. The reconstitution was carried out at a temperature of 18° C.

All powders dispersed into the milk well. No problems were noticed with powders lumping, not wetting or floating on top of the milk. The pH of all the reconstituted milks were similar and between 6.4 and 6.5 when measured at 32.5° C.

Cheese manufacture was by a standard cheddar process. Calcium chloride was added to all batches at a rate of 0.2 g/L of milk. The rennet used was Australian DS.

The cheese preparations were examined after being pressed overnight at 5° C. In the cheese preparation to which the control MPC had been added many medium-sized, grey translucent nuggets were obvious. No nuggets were observed in the cheese preparations to which the 33% or the 46% calcium depleted MPC had been added.

Example 7

Cheese Preparation using Calcium-Chelated MPC 85

Two MPC samples with 85% milk protein were tested in cheese making.

Cheese milk with a fat to protein ratio of 1.2 was prepared by standardising fresh, fortified skim milk with fresh cream. Normally, 1 part cream was added to 7 parts milk. The cream (at 30° C.) was added to the milk (also at 30° C.) under medium shear.

The standardised milk was divided into two batches. A different MPC containing 85% protein was added to each batch. One batch received a control MPC with no calcium depletion. The other batch received an MPC with 85% protein to which EDTA had been added during manufacture (83 g EDTA per Kg MPC). According to calcium analyses, the EDTA sequestered 10% of the calcium. The reconstitution was caried out at a temperature of 18° C.

All powders dispersed into the milk well. No problems were noticed with powders lumping, not wetting or floating on top of the milk. The pH of all the reconstituted milks were similar and between 6.4 and 6.5 when measured at 32.5° C.

Cheese manufacture was by a standard cheddar process. Calcium chloride was added to all batches at a rate of 0.2 g/L of milk. The rennet used was Australian DS.

The cheese preparations were examined after being pressed overnight at 5° C. In the cheese preparation to which the control MPC had been added many medium-sized, grey translucent nuggets were obvious. A few, small nuggets were observed in the cheese preparation to which the EDTA-treated MPC had been added. The number and size of the nuggets observed was an expected for a 10% calcium depleted-MPC with 85% protein. It is believed that increasing the extent of calcium depletion to 30% would have eliminated the nugget problem entirely.

General

Observations made during the cheese making steps showed that the starters performed excellently in all the re-constituted milks.

All preparations developed a coagulum at 40 minutes after rennet was added. The cooked curd character was excellent for all samples. None of the curds presented any problems during the salting and pressing steps.

CONCLUSIONS

The calcium depleted MPC powders with 85% protein support formation of nugget free cheddar cheese in the laboratory with powders having more than 30% calcium depletion being required.

The calcium depleted MPC powders with 70% protein support formation of nugget free cheddar cheese in the laboratory with powders having more than 20% calcium depletion being required.

The above examples are illustrations of the practice of the invention. It will be appreciated by those skilled in the art that the invention can be carried out with numerous modifications and variations. For example, the material subjected to calcium depletion can show variations in protein concentration and pH, the method of calcium depletion can be varied, the percentage calcium depletion and drying procedures can also be varied.

The invention claimed is:

1. A method of cheese manufacture comprising:
    (a) dispersing in milk a dried MPC or MPI having at least 70% dry matter as milk protein;
    (b) treating the resulting mixture with one or more coagulating enzymes to produce a curd, and
    (c) processing the curd to make cheese; wherein the dried MPC or MPI is a calcium-depleted MPC or MPI.

2. A method of cheese manufacture as claimed in claim 1 wherein the dried MPC or MPI has calcium depletion of 30–100%.

3. A method for preparing a dried MPC or MPI product comprising:
    (a) providing an MPC or MPI having at least 70% dry matter as milk protein in aqueous solution/suspension;
    (b) removing 30–100% of calcium ions therein by one or more methods selected from the group consisting of (1) cation exchange on an ion exchanger, (2) acidification to pH 4.6–6 followed by one or more treatments selected from the group consisting of dialysis, ultrafiltration and diafiltration and (3) by addition of a chelating agent; and
    (c) drying to prepare a dried product.

4. A method for preparing a dried MPI or MPC having at least 70% by weight of milk protein comprising:
    (a) providing an MPI or MPC, in aqueous solution or suspension;
    (b) removing 40–100% of calcium ions therein by a method selected from the group consisting of (1) cation exchange on an ion exchanger, wherein the ion exchanger is in the sodium form, in other potassium form, or in the sodium and potassium form, (2) acidification to pH 4.6–6 with subsequent treatment selected from the group consisting of dialysis and ultrafiltration and diafiltration and (3) by addition of a chelating agent; and
    (d) drying to prepare a dried product.

5. A method of preparing a dried MPI or MPC comprising:
    (a) providing an MPI or MPC having at least 70% dry matter as milk protein aqueous solution or suspension;
    (b) contacting at least a portion of the MPI or MPC with a cation exchanger for a time sufficient to remove 30–100% of the calcium ions in the MPC or MPI by substitution with sodium ions, potassium ions or both sodium and potassium ions; and
    (c) drying to prepare a dried product.

6. A method as claimed in claim 5 wherein the cation exchanger has strongly acidic groups.

7. A method as claimed in any one of claims 1 to 4 wherein the calcium is substituted by sodium ions, potassium ions or a mixture of both.

8. A method as claimed in claim 5 wherein the calcium depletion is 40–100%.

9. A method as claimed in claim 5 wherein the calcium depletion is 50–100%.

10. A method of preparing a dried MPC or MPI comprising:
    (a) providing a low fat milk solution;
    (b) removing 30–100% of calcium ions therein by a method selected from the group consisting of (1) cation exchange on an ion exchange in the sodium form, the potassium form or the sodium and potassium form, and (2) acidification to pH 4.6–6 with subsequent neutralization following calcium removal and prior to drying;

(c) concentrating the solution by ultrafiltration or ultrafiltration with diafiltration, to form an MPC or MPI having at least 70% dry weight of protein; and (d) drying to prepare a dried product.

11. A method as claimed in claim 10 wherein cation exchange is used in step (b).

12. A method as claimed in claim 10 wherein the calcium is substituted by sodium ions, potassium ions or a mixture of both.

13. A method as claimed in claim 10 wherein the calcium depletion is 40–100%.

14. A method of cheese manufacture comprising:
(a) dispensing in milk a dried MPC or MPI prepared by a method as claimed in claim 3, 4, to 10;
(b) treating the resulting mixture with one or more coagulating enzymes to produce a curd; and
(c) processing the curd to make cheese.

15. A blended product comprising a whole milk powder and an MPC or MPI wherein said MPC or MPI was prepared by a method claimed in claim 3, 4, 5 or 10.

16. A method of cheese manufacture comprising:
(a) dispersing in an aqueous solution, a blended product of claim 15;
(b) treating the resulting mixture with one or more coagulating enzymes to produce a curd, and;
(c) processing the curd to make cheese.

17. A method according to claim 3 or claim 4 wherein calcium removal is by acidification and one or more subsequent treatments selected from the group consisting of dialysis and ultrafiltration and diafiltration.

18. A method of claim 3 or claim 4 wherein calcium removal is by addition of a chelating agent.

19. A method of claim 18 wherein the chelating agent is a food acidulant.

20. A method as claimed in claim 3, 4, 5, 8, 9, 10, 11, or 12, wherein the calcium depletion is at least 50%.

21. A method as claimed in any one of claims 1 or 2 wherein the calcium depletion is at least 50%.

22. A method of cheese manufacture comprising:
(a) dispersing in milk, a dried MPC having 70–80% dry matter as milk protein and 20–100% calcium depletion;
(b) treating the resulting mixture with one or more coagulating enzymes to produce a curd;
(c) processing the curd to make cheese.

23. The method of claim 3 wherein the ion exchanger is in sodium form, potassium form or both sodium and potassium form.

24. The method of claim 3 additionally comprising mixing the product from step (b) with another milk solution while maintaining at least 30% calcium depletion prior to drying.

25. The method of claim 4 additionally comprising mixing the product from step (b) with another milk solution while maintaining the percentage calcium depletion in the range of 40–100% prior to drying.

26. The method of claim 5 additionally comprising mixing the calcium depleted MPC or MPI with another MPC or MPI while maintaining the percentage calcium depletion in the range of 30–100% prior to drying.

27. The method of claim 10 additionally comprising mixing the calcium-depleted milk from step (b) with another milk solution while retaining the percentage calcium depletion in the range 30–100% prior to concentrating the solution in step (c).

28. The method of claim 10 wherein acidification is followed by dialysis.

29. The method of claim 12 wherein the calcium is substituted with sodium ions and magnesium ions, potassium ions and magnesium ions or sodium ions, potassium ions and magnesium ions.

30. A method of cheese manufacture comprising:
(a) dispensing in milk a dried MPC or MPI prepared by a method as claimed in any one of claims 5 or 11;
(b) treating the resulting mixture with one or more coagulating enzymes to produce a curd; and
(c) processing the curd to make cheese.

31. The method of claim 14 wherein the calcium depletion is at least 50%.

* * * * *

UNITED STATES PATENT AND TRADEMARK OFFICE
CERTIFICATE OF CORRECTION

PATENT NO. : 7,157,108 B2
APPLICATION NO. : 10/148976
DATED : January 2, 2007
INVENTOR(S) : Ganugapati Bhaskar, Harjinder Singh and Neil D. Blazey It is certified that error appears in the above-identified patent and that said Letters Patent is hereby corrected as shown below:

On the title page, under item (56) References Cited, Col. 2 (Foreign Patent Documents), line 1, above "EP 016292 10/1980" please delete "EP 16292 10/1980".

In Col. 1, line 5, please delete "11,2000." and insert --11, 2000.--, therefor.

In Col. 3, line 49, after "has" please delete "the."

In Col. 4, line 48, please delete "depleted MPI." and insert the same after "dried calcium" on line 47 as a continuous paragraph.

In Col. 5, line 30, please delete "litres" and insert --liters--, therefor.

In Col. 8, lines 10-14, after "cheese making." please delete "Cheese milk with a fat...under medium shear." and insert the same on line 11 as a new paragraph.

In Col. 8, line 20, please delete "1 8°" and insert --18°--, therefor.

In Col. 9, line 21 (approx.) please delete "caried" and insert --carried--, therefor.

In Col. 10, line 15, Claim 3, please delete "solution/" and insert --solution or--, therefor.

In Col. 10, line 32, Claim 4, please delete "other" and insert --the--, therefor.

In Col. 10, line 38, Claim 4, please delete "(d)" and insert --(c)--, therefor.

In Col. 10, line 64, Claim 10, please delete the second instance of "exchange" and insert --exchanger--, therefor.

In Col. 11, line 14, Claim 14, please delete "to" and insert --or--, therefor.

In Col. 11, line 35, Claim 20, please delete "11," and insert --11--, therefor.

UNITED STATES PATENT AND TRADEMARK OFFICE
CERTIFICATE OF CORRECTION

PATENT NO. : 7,157,108 B2
APPLICATION NO. : 10/148976
DATED : January 2, 2007
INVENTOR(S) : Ganugapati Bhaskar, Harjinder Singh and Neil D. Blazey It is certified that error appears in the above-identified patent and that said Letters Patent is hereby corrected as shown below:

In Col. 11, line 37, Claim 21, after "claimed in" please delete "any one of."

Signed and Sealed this

Seventh Day of August, 2007

JON W. DUDAS
*Director of the United States Patent and Trademark Office*